United States Patent

Johnston et al.

[19]

[11] Patent Number: 5,857,332
[45] Date of Patent: Jan. 12, 1999

[54] BEARING SYSTEMS FOR MOTOR-ASSISTED TURBOCHARGERS FOR INTERNAL COMBUSTION ENGINES

[75] Inventors: Bevan H. Johnston, Spring Valley; Edward M. Halimi, Montecito; William E. Woollenweber, Carlsbad, all of Calif.

[73] Assignee: Turbodyne Systems, Inc., Carpinteria, Calif.

[21] Appl. No.: 771,032

[22] Filed: Dec. 20, 1996

[51] Int. Cl.⁶ ..................................................... F02B 37/10
[52] U.S. Cl. ............................................. 60/607; 417/407
[58] Field of Search ....................... 60/607, 608; 417/407

[56] References Cited

U.S. PATENT DOCUMENTS

| | | |
|---|---|---|
| 2,078,499 | 4/1937 | Ljungstrom . |
| 2,173,489 | 9/1939 | Voigt . |
| 2,578,785 | 12/1951 | Davis . |
| 2,649,048 | 8/1953 | Pezzillo et al. . |
| 2,782,721 | 2/1957 | White . |
| 2,829,286 | 4/1958 | Britz . |
| 2,956,502 | 10/1960 | Glaser et al. ........................... 417/407 |
| 3,056,634 | 10/1962 | Woollenweber et al. ............... 417/407 |
| 3,077,296 | 2/1963 | Ping ....................................... 417/407 |
| 3,163,790 | 12/1964 | White . |

(List continued on next page.)

FOREIGN PATENT DOCUMENTS

| | | |
|---|---|---|
| 295985 | 12/1988 | European Pat. Off. . |
| 367406 | 5/1990 | European Pat. Off. . |
| 2479899 | 9/1981 | France . |
| 57-212331 | 12/1982 | Japan . |
| 58-222919 | 12/1983 | Japan . |
| 59-49323 | 3/1984 | Japan . |
| 3202633 | 9/1991 | Japan . |
| 4-112921 | 4/1992 | Japan . |
| 5-5419 | 1/1993 | Japan . |
| 767471 | 9/1980 | Russian Federation ............... 417/407 |
| 267149 | 8/1927 | United Kingdom . |
| 308585 | 3/1929 | United Kingdom . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F.J. Wallace, et al.

Primary Examiner—Michael Koczo
Attorney, Agent, or Firm—Brinks Hofer Gilson & Lione

[57] ABSTRACT

In a unique turbocharger shaft bearing system, a thrust bearing is provided inboard of the compressor end shaft bearing. Removable parts of the turbocharger housing permit assembly of a first thrust bearing part with an outwardly extending flange forming at least one thrust bearing interface to be fastened to the rotating shaft for rotation therewith and a separate stationary thrust bearing part to be carried by the housing, providing thrust bearing interface for the thrust bearing interface of the rotating first thrust bearing part inboard of the compressor end of shaft bearing. The removable parts can include a separate supporting member for the compressor end shaft bearing. The remainder of the turbocharger housing supports the second shaft bearing adjacent its turbine end and, through the separate bearing supporting member, the first shaft bearing. The thrust bearing can also include a second rotating thrust bearing part carried by and rotating with the rotating shaft and providing an outwardly extending flange adjacent its turbine end spaced from the outwardly extending flange of the first rotating thrust bearing part and forming a second thrust bearing interface so the thrust bearing interface of the first rotating thrust bearing part can engage the separate stationary thrust bearing member on its compressor side while the thrust bearing interface of the second rotating thrust bearing part engages the thrust bearing member on its turbine side. Providing a thrust bearing inward of the compressor end shaft bearing minimizes bearing overhang, allows an increase in distance between the two shaft bearings, and improves bearing systems stability.

34 Claims, 2 Drawing Sheets

U.S. PATENT DOCUMENTS

| | | | |
|---|---|---|---|
| 3,258,199 | 6/1966 | Anderson | 417/407 |
| 3,557,549 | 1/1971 | Webster . | |
| 3,572,982 | 3/1971 | Kozdon . | |
| 3,961,199 | 6/1976 | Bronicki . | |
| 4,364,717 | 12/1982 | Schippers et al. | 417/407 |
| 4,445,337 | 5/1984 | McCreary | 60/608 |
| 4,453,381 | 6/1984 | Dinger | 60/612 |
| 4,565,505 | 1/1986 | Woollenweber | 417/407 |
| 4,641,977 | 2/1987 | Woollenweber . | |
| 4,708,095 | 11/1987 | Luterek . | |
| 4,708,602 | 11/1987 | McEachern, Jr. et al. | 417/407 |
| 4,776,168 | 10/1988 | Woollenweber | 60/602 |
| 4,827,170 | 5/1989 | Kawamura et al. . | |
| 4,850,193 | 7/1989 | Kawamura | 60/608 |
| 4,878,347 | 11/1989 | Kawamura | 60/608 |
| 4,882,905 | 11/1989 | Kawamura | 60/608 |
| 4,885,911 | 12/1989 | Woollenweber et al. | 60/597 |
| 4,894,991 | 1/1990 | Kawamura | 60/608 |
| 4,901,530 | 2/1990 | Kawamura | 60/608 |
| 4,918,923 | 4/1990 | Woollenweber et al. | 60/614 |
| 4,935,656 | 6/1990 | Kawamura . | |
| 4,955,199 | 9/1990 | Kawamura | 60/608 |
| 4,958,497 | 9/1990 | Kawamura | 60/608 |
| 4,958,708 | 9/1990 | Kawamura . | |
| 4,981,017 | 1/1991 | Hara et al. | 60/608 |
| 4,998,951 | 3/1991 | Kawamura | 60/608 |
| 5,025,629 | 6/1991 | Woollenweber | 60/600 |
| 5,038,566 | 8/1991 | Hara | 60/608 |
| 5,074,115 | 12/1991 | Kawamura | 60/608 |
| 5,088,286 | 2/1992 | Muraji | 60/608 |
| 5,094,587 | 3/1992 | Woollenweber . | |
| 5,121,605 | 6/1992 | Oda et al. | 60/608 |
| 5,176,509 | 1/1993 | Schmider et al. . | |
| 5,406,797 | 4/1995 | Kawamura | 60/608 |
| 5,560,208 | 10/1996 | Halimi et al. | 60/608 |
| 5,605,045 | 2/1997 | Halimi et al. | 60/607 |

BEARING SYSTEMS FOR MOTOR-ASSISTED TURBOCHARGERS FOR INTERNAL COMBUSTION ENGINES

FIELD OF THE INVENTION

This invention relates generally to supercharging apparatus for use with internal combustion engines, and more particularly to bearing systems and methods of more effectively combining turbocharger and electric motor components of a motor-assisted turbocharger assembly.

BACKGROUND OF THE INVENTION

Turbochargers are well known and widely used with internal combustion engines. Turbochargers convert energy of the engine exhaust gas to an increased supply of charge air to the cylinders of the engine. Generally, turbochargers supply more charge air for the combustion process than can otherwise be induced through natural aspiration. The increased charge air supply allows more fuel to be burned, thereby increasing power and torque obtainable from an engine having a given displacement and improved performance characteristics from available production engines. Additional benefits include the possibility of using lower-displacement, lighter engines with corresponding lower total vehicle weight to reduce fuel consumption. Some turbocharger applications include the incorporation of an intercooler for removing heat (both an ambient heat component and heat generated during charge air compression) from the charge air before it enters the engine, thereby providing an even more dense air charge to be delivered to the engine cylinders. Intercooled turbocharging applied to diesel engines has been known to at least double the power output of a given engine size, in comparison with naturally aspirated diesel engines of the same engine displacement.

Additional advantages of turbocharging include improvements in thermal efficiency through the use of some energy of the exhaust gas stream that would otherwise be lost to the environment, and the maintenance of sea level power ratings up to high altitudes.

At medium to high engine speeds, there is an abundance of energy in the engine exhaust gas stream and, over this operating speed range, the turbocharger is capable of supplying the engine cylinders with all the air needed for efficient combustion and increased power and torque output for a given engine construction. In certain applications, however, an exhaust gas waste gate is needed to bleed off excess energy in the engine exhaust gas stream before it enters the turbocharger turbine to prevent the engine from being overcharged with air. Typically, such waste gates are set to open and to limit exhaust gas energy at a pressure below which undesirable predetonation or an unacceptably high internal engine cylinder pressure may be generated.

At low engine speeds, such as idle speed, however, there is disproportionately little energy in the exhaust system than may be found at higher engine speeds, and this energy deficiency prevents the turbocharger from providing a significant level of charge air boost in the engine intake air system. As a result, when the throttle is opened for the purpose of accelerating the engine from low speeds, such as idle speed, there is a measurable time lag and corresponding engine performance delay, before the exhaust gas energy level rises sufficiently to accelerate the turbocharger rotor and provide the compression of intake air needed for improved engine performance. The performance effect of this time lag may be pronounced in smaller output engines which have a relatively small amount of power and torque available before the increased turbocharger output provides the desired compression. Various efforts have been made to address this issue of time lag, including reductions of inertia of turbocharger rotors.

In spite of evolutionary design changes for minimizing the inertia of the turbocharger rotor, however, the time lag period is still present to a significant degree, especially in turbochargers for use with highly rated engines intended for powering a variety of on-highway and off-highway equipment.

Furthermore, to reduce exhaust smoke and emissions during acceleration periods, when an optimal fuel burn is more difficult to achieve and maintain as compared with steady-speed operation, commercial engines employ devices in the fuel system to limit the fuel delivered to the engine cylinders until a sufficiently high boost level can be provided by the turbocharger. These devices can reduce excessive smoking, but the limited fuel delivery rate is a further cause of sluggishness in engine performance.

The turbo-lag period can be mitigated and, in many instances, virtually eliminated by using an external power source to assist the turbocharger in responding to engine speed and load increases. One such method is to use an external electrical energy supply, such as energy stored in d.c. batteries, to power an electric motor attached to the turbocharger rotating assembly. The electric motor can be external and attached to the turbocharger rotor through a clutching mechanism, or it can be added onto the turbocharger rotating assembly and energized and de-energized through the use of appropriate electronic controls.

Patents disclosing turbocharger-electrical machine combinations include U.S. Pat. Nos. 5,406,797; 5,038,566; 4,958,708; 4,958,497; 4,901,530; 4,894,991; 4,882,905; 4,878,317 and 4,850,193.

In some turbocharger-electrical machine combinations, permanent magnets, as electrical machine rotor elements, have been attached to the turbocharger shaft. The attachment of the permanent magnets to the turbocharger shaft has a major disadvantage in that the magnets are subjected to heat which is conducted along the shaft from the hot turbine wheel of the turbocharger, and the permeability of the magnets may be reduced by such heating to a level which may be unacceptable for efficient operation of the electric machine. When the turbocharged engine is subjected to a hot shutdown and the lubricating oil flow through the turbocharger bearings and over the turbocharger shaft is interrupted, a steep temperature gradient will exist for a significant length of time until the hot parts of the turbocharger are drained of their heat content.

In other turbocharger-electrical machine combinations, permanent magnet machine rotor elements have been mounted on the aluminum compressor wheel of a turbocharger outboard of the turbocharger shaft bearing system. The addition of motor components such as rotor magnets to the turbocharger compressor wheel, however, results in increasing the overhang of the compressor wheel to such an extent that the stability of the turbocharger bearing system becomes questionable. Most commercial turbochargers in general use on internal combustion engines employ a bearing system in which two floating bushings are used with an outboard stationary thrust bearing.

SUMMARY OF THE INVENTION

The present invention presents a unique turbocharger bearing system by providing a thrust bearing inboard of the compressor end shaft bearing. A preferred turbocharger of the invention comprises a compressor wheel and turbine wheel mounted on opposite ends of a rotating shaft, with a first bearing adjacent the compressor end of the shaft and a second bearing adjacent the turbine end of the shaft and a thrust bearing between the first and second shaft bearings; a housing for carrying the first and second bearings and rotating shaft; an integral assisting electric motor in the compressor end of the housing; an exhaust gas volute for directing exhaust gas into the turbine wheel; and a compressor casing for receiving compressed air from the compressor rotor. Such preferred turbochargers include removable parts permitting assembly of a first thrust bearing part with an outwardly extending flange forming at least one thrust bearing interface to be fastened to the rotating shaft for rotation therewith and a separate stationary thrust bearing part to be carried by the housing, providing thrust bearing interface for the thrust bearing interface of the rotating first thrust bearing part inboard of the compressor end shaft bearing. Preferably, the removable parts include a separate supporting member for the compressor end shaft bearing. The remainder of the housing supports the second shaft bearing adjacent the turbine end and, through the separate bearing supporting member, the first shaft bearing. The first thrust bearing part comprises preferably a sleeve portion carried by the rotating shaft and rotating within the first shaft bearing and forming at one end the outwardly extending flange and thrust bearing interface. The preferred turbocharger can also include a second rotating thrust bearing part carried by and rotating with the rotating shaft and providing an outwardly extending flange adjacent its turbine end spaced from the outwardly extending flange of the first rotating thrust bearing part and forming a second thrust bearing interface so the thrust bearing interface of the first rotating thrust bearing part can engage the separate stationary thrust bearing member on its compressor side while the thrust bearing interface of the second rotating thrust bearing part engages the separate stationary thrust bearing member on its turbine side.

In turbochargers where motor magnets of an integral assisting motor are mounted outward of the compressor end shaft bearing, for example, on the compressor wheel, providing a thrust bearing inward of the compressor end shaft bearing minimizes bearing overhang, allows an increase in distance between the two shaft bearings, and improves bearing systems stability. Furthermore, this arrangement permits stator windings of an electric assisting motor to be mounted in an aluminum housing portion that can contain a water jacket permitting engine coolant to be circulated through the aluminum housing to keep the motor windings at safer operating temperatures, further assists the location of the electric motor components such as rotor magnets and stator windings in the coolest part of a turbocharger, and permits greater power to be developed by the assisting electric motor and applied to the rotating shaft of the turbocharger for assisting engine performance during acceleration periods.

Other features and advantages of the invention will be apparent from the drawings and more detailed description of the invention that follows.

DETAILED DESCRIPTION OF THE DRAWINGS

Figure 1:
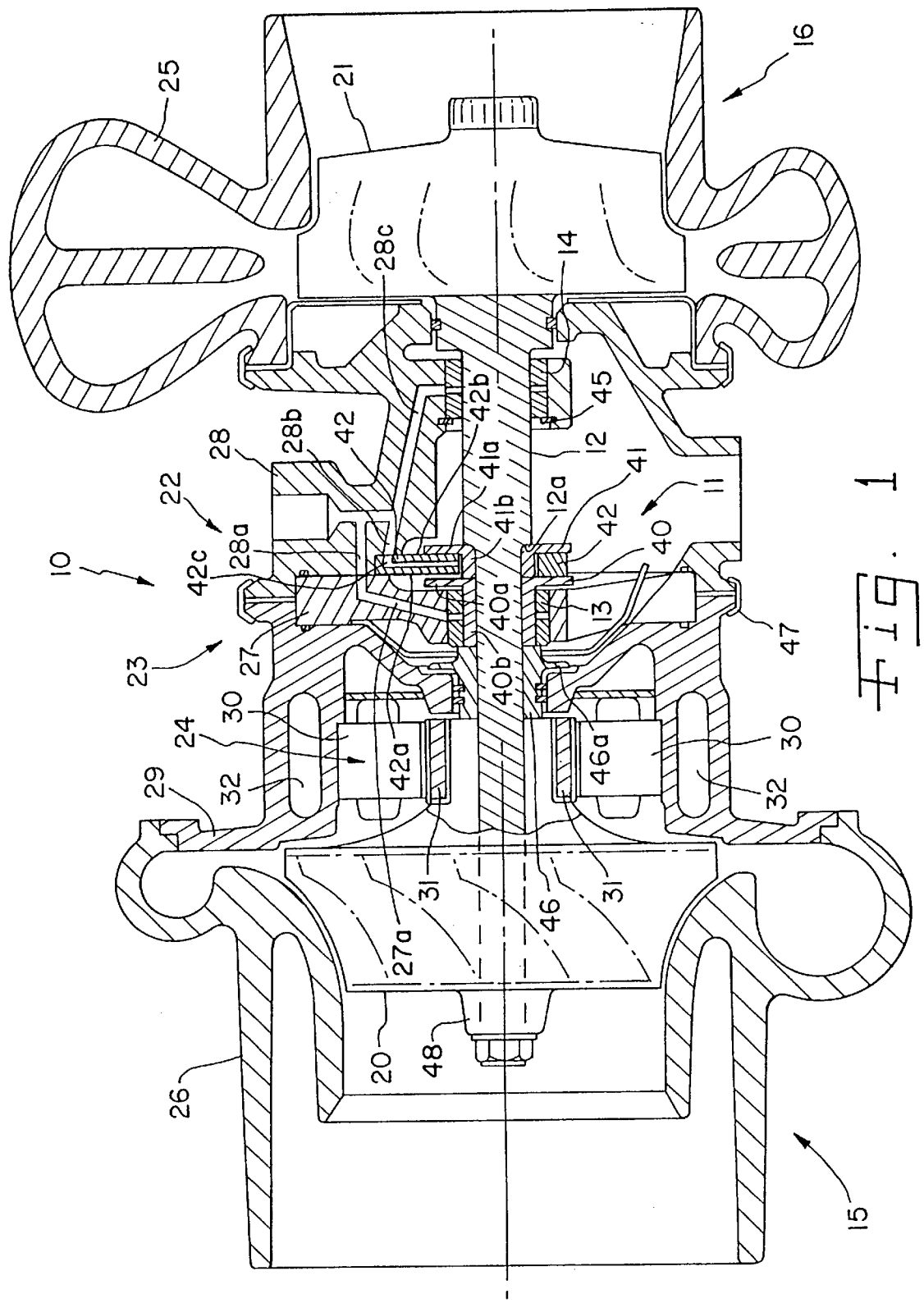
Figure 2:
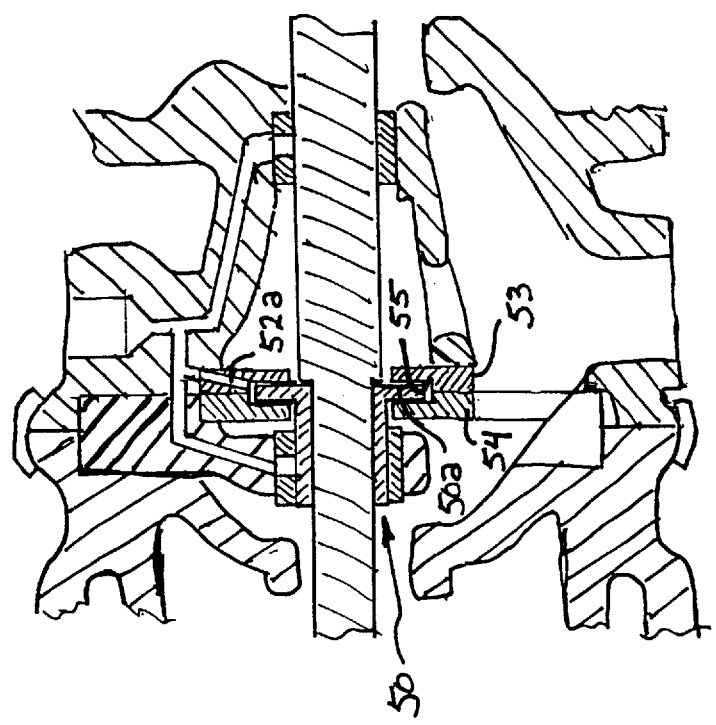

FIG. 1 is a cross-sectional view of a preferred embodiment of the invention taken at a plane through its center; and FIG. 2 is a partial cross-sectional view of an alternative embodiment of the invention taken at a plane through its center.

DETAILED DESCRIPTION OF BEST MODE OF THE INVENTION

FIG. 1 is a cross-sectional view of a turbocharger 10 of the invention at a plane taken through the geometric center of its rotating shaft. As described further below, turbochargers 10 of the invention include a thrust bearing assembly 11 for rotating shaft 12 between the first bearing 13 for the rotating shaft adjacent its compressor end and the second bearing 14 for the rotating shaft adjacent its turbine end. Where, in this description, we refer to the compressor end or compressor side, we mean that portion of the turbocharger element or turbocharger that is closer to the compressor 15 than to the turbine 16 or that faces the compressor 15, and where, in this description, we refer to the turbine end or turbine side, we mean that portion of the turbocharger element or turbocharger that is closer to the turbine 16 than the compressor 15 or that faces the turbine 16.

More particularly, a motor-assisted turbocharger assembly of the invention comprises a compressor wheel 20 and turbine wheel 21 mounted at opposite ends of the rotating shaft 12. The rotating shaft 12 is carried within the first bearing 13 and second bearing 14, which as shown in FIGS. 1 and 2, comprise sleeve bearings of the type well known in the art. The first and second sleeve bearings 13, 14 are carried by housing 22 and in turn carry the rotating shaft 12. As further described below, the housing 22 preferably includes parts 23 adjacent the compressor end of the turbocharger which are removable, and a removable part of the compressor end of the turbocharger assembly includes the components of an assisting electric motor 24. As well known in the art, an exhaust gas volute 25 is removably attached to the turbine end of the housing 22 and a compressor casing 26 is removably attached to the compressor end of the housing 22.

As will be apparent from the drawing, the removability of the compressor end parts 23 of the housing permits the assembly of the thrust bearing 11 inboard of the compressor end bearing 13. As indicated in FIG. 1, the removable parts 23 of the housing include a separate bearing supporting member 27 for the first bearing 13. The second housing part, or remainder of the housing 28, supports the second bearing 14 adjacent the turbine end of the rotating shaft and locates and supports the separate bearing supporting member for the first bearing 13. As indicated in FIG. 1, the removable parts of the housing 23 also include the second part 29 of the housing which seats on and retains the separate bearing supporting member 27 when connected with the second part 28 of the housing. The housing assembly provides concentric location and support of the shaft bearings 13 and 14 and provides an assembly that can accommodate differential expansion between the rotating shaft and the housing portion of the assembly.

The first housing part 29 carries a plurality of stator windings 30 for the assisting electric motor and, when seated and connected to the second part 28 of the housing, locates the stator windings 30 adjacent a plurality of motor magnets 31 carried by the compressor rotor 20 in such near proximity that when the stator windings 30 are energized with the rotating magnetic field, the rotating magnetic field interacts with the motor magnets 31 to provide a rotational driving force for the rotating shaft 12. As indicated in FIG. 1, the housing part 29 forms a coolant passageway 32 adjacent and in heat transfer relationship with the stator windings 30 so that upon circulation of a coolant, such as the coolant of the internal combustion engine through the coolant passageway 32, heat generated by the electrical losses of the stator windings may be carried away by the coolant, permitting more power to be applied to the stator windings 30 and generated by the rotating magnetic field while maintaining the stator windings at satisfactory operating temperatures. Thus, a larger and more powerful electric motor may be incorporated into the motor-assisted turbocharger 10 than might otherwise be possible.

However, as noted above, the presence of the electric motor 24 outboard of the compressor end shaft bearing 13 may cause shaft bearing instability in the absence of the bearing system of the invention including its inboard thrust bearing assembly 11.

As shown in FIG. 1, rotating shaft 12 has a reduced diameter at its compressor end and a larger diameter at its turbine end with a thrust bearing engagement surface 12a between the first and second shaft portions. The thrust bearing 11 of FIG. 1 comprises first and second thrust bearing parts 40 and 41, that rotate with shaft 12, and a stationary thrust bearing member 42 carried by the second housing part 28 and, in the embodiment shown in FIG. 1, retained therein by the separate bearing supporting member 27. As shown in FIG. 1, the first thrust bearing part 40 includes an outwardly extending flange portion 40a forming a thrust bearing interface on its compressor side, and the second thrust bearing part 41 includes an outwardly extending flange 41a forming a thrust bearing interface on its turbine side. The stationary thrust bearing member 42, which is preferably bronze and lubricated in a manner to be described, forms thrust bearing interfaces with its compressor side 42a and its turbine side 42b. Because the outwardly extending flanges 40a and 41a are fastened to and rotate with the shaft 12, their interfaces with the stationary thrust bearing member 42 provide a thrust bearing between the shaft bearings 13 and 14 allowing an increase in the distance between shaft bearings 13 and 14 which reduces the overhang of the rotating turbocharger parts outboard of the compressor end shaft bearing 13 and improves the stability of the turbocharger bearings system.

In the system of FIG. 1, the first thrust bearing part 40 includes a sleeve portion 40b providing at its outer surface a bearing surface for the first shaft bearing 13 that has the same diameter as the bearing surface at the larger diameter turbine end of the shaft and permits the use of identical sleeve bearings for both the first bearing 13 and second bearing 14.

As shown by FIG. 1, the housing part 28 is provided with oil passageways 28a, 28b and 28c that allow oil passage to, respectively, the first bearing 13, the thrust bearing assembly 11 and the second bearing 14. The separate bearing supporting member 27 for the first bearing 13 includes an oil passage 27a leading from the oil passage 28a of housing part 28 to the first bearing 13. In like manner, the stationary thrust bearing part 42 includes an oil passage 42c allowing lubricating oil to lubricate the thrust bearing interfaces 40a–42a and 41a–42b.

Assembly of the turbocharger 10 begins with the insertion of the second shaft bearing 14 into the second housing part 28 where it seats against snap ring 45. The turbine wheel 21 and rotating shaft 12 are then inserted through the second bearing 14. With the shaft 12 in position within housing part 28, the second rotating thrust bearing part 41 is placed over the reduced diameter portion of the shaft until it seats on the thrust bearing engagement surface 12a. The stationary thrust bearing part 42 is then positioned within the housing part 28 around the sleeve portion 41b of the second rotating thrust bearing part 41. The first rotating thrust bearing part 40 is placed over the reduced diameter portion of the shaft 32 and is seated on the sleeve portion 41b of the second rotating thrust bearing part 41. The separate bearing supporting member 27 and the first bearing 13 are then placed over the sleeve portion 40b of the first rotating thrust bearing part 40, and a spacer 46 including an oil slinger portion 46a is seated against the first rotating thrust bearing part 40. The first housing part 29 and stator motor windings 30 are then placed over and seated on the separate bearing supporting member 27. At this time, housing parts 28 and 29 may be connected together; for example, with a peripheral clamp fastener 47. The compressor rotor 20 is then placed over the reduced diameter portion of the shaft with the motor magnets 31 adjacent and within the plurality of stator windings 30. A nut 48 is placed on the threaded compressor end of the rotating shaft 12 and tightened to compress the compressor rotor 20, spacer 46 and the first and second rotating parts of the thrust bearing 40 and 41 against the thrust bearing engagement surface 12a between the shaft bearings 13 and 14. The exhaust gas volute 28 and compressor casing 26 may both then be attached at their respective ends of the housing assembly 22.

The dimensions of the thrust bearing assembly 11 are such that axial clearance at the thrust bearing interfaces are on the order of about 0.0102 cm to about 0.0204 cm. Furthermore, as shown in FIG. 1, lubricating oil is provided at the inner portion of the stationary thrust bearing member 42 and is forced by the pressure of the lube oil outwardly over the thrust bearing interfaces 40a–42a and 41a–42b.

FIG. 2 is an alternative embodiment of the invention in which the rotating thrust bearing part 50 comprises a single outwardly extending flange portion 50a and the stationary thrust bearing part 52 comprises a first part 53 and second removable part 54. As shown in FIG. 2, the first and second parts 53, 54 of the stationary thrust bearing part 52 form a cylindrical annular cavity 55, the second stationary thrust bearing part 54, when seated in the assembly, forming the annular cylindrical cavity 55 so it encompasses the outwardly extending flange portion 50a of the rotating thrust bearing part. In the alternate embodiment of FIG. 2, the turbine side and compressor side of the outwardly extending flange portion 50a each form thrust bearing interfaces with the interior facing sides of the annular cylindrical cavity 55 of the stationary thrust bearing part 52 forming thrust bearing interfaces that engage a thrust bearing interfaces at the sides of the outwardly extending flange 50a. The stationary thrust bearing member 52 can be formed with a oil passage that delivers oil into the annular cavity 55 for lubricating of the thrust bearing interfaces.

Although FIGS. 1 and 2 illustrate a turbocharger in which the first bearing 13 is a sleeve bearing, the first bearing 13 may also be a roller bearing, such as a ball bearing. In embodiments including a roller or ball bearing as the first bearing, the inner race of the ball bearing will be clamped between the spacer 46 and the first rotating thrust bearing part 40, 50 and the outer race of the roller or ball bearing will be fastened to the separate bearing supporting member 27, which may require a cross-sectional configuration somewhat different from that shown in FIG. 1 to accommodate a roller bearing within the assembly.

Thus, the invention provides a stable bearing system in which the rotating shaft is free to move radially and in response to imbalance in the rotating mass, thrust loads are taken toward the cooler compressor end of the turbocharger, and the rotating shaft is free to expand in response to its exposure to heat through the sleeve bearings at the hot end of the machine. In the bearing system of the invention, oil films cushion the rotating shaft against shock and vibration, provide adequate lubricant, carry away heat from the bearing surfaces, and also tend to reduce the heat carried down the shaft from the hot end of the machine thereby reducing the effect of turbine-generated heat at the assisting electric motor.

While preferred turbochargers of the invention include an integral electric motor within the assembly at its compressor end, the invention may be advantageously used in conventional turbochargers that include no such electric motor, particularly when the compressor rotor has increased mass or must overhang the compressor end shaft bearings.

While we have shown and described what we believe to be the best mode of our invention, other embodiments may be devised by those skilled in the art without departing from the spirit and scope of the following claims, which are limited in scope by only the prior art.

We claim:

1. A motor-assisted turbocharger assembly for an internal combustion engine, comprising a compressor wheel and turbine wheel mounted at opposite ends of a rotating shaft, a first bearing adjacent the compressor end of the rotating shaft, a second bearing adjacent the turbine end, of the rotating shaft, a thrust bearing for said rotating shaft between said first and second bearings, a housing carrying said first and second bearings and said rotating shaft, an assisting electric motor in the compressor end of said assembly, an exhaust gas volute for directing exhaust gas from the internal combustion engine into the turbine wheel and a compressor casing for receiving compressed air from the compressor wheel.

2. The assembly of claim 1 wherein said housing includes a first housing part adjacent the compressor wheel and a second housing part adjacent the turbine wheel, said assembly includes a separate bearing supporting member for said first bearing, and said second housing part supports said second bearing adjacent its turbine end and said separate bearing supporting member for said first bearing.

3. The assembly of claim 2 wherein said first housing part is seated on said separate bearing supporting member and is connected with said second housing part and carries stator windings for said assisting electric motor around the rotating shaft.

4. The assembly of claim 3 wherein said first housing part forms a coolant passageway adjacent said stator windings.

5. The assembly of claim 4 wherein said coolant passageway encompasses said stator windings.

6. The assembly of claim 2 wherein said thrust bearing comprises a first rotating part including a sleeve portion carried by said rotating shaft and rotating within said first bearing and an outwardly extending flange adjacent its turbine end with a thrust bearing interface.

7. The assembly of claim 6 wherein said assembly includes a stationary thrust bearing member, carried by said second housing part and retained by engagement with said separate bearing supporting member, said thrust bearing member providing a thrust bearing interface for engagement by the thrust bearing interface of the outwardly extending flange of said first rotating part.

8. The assembly of claim 7 wherein said assembly includes a second rotating part carried by and rotating with said rotating shaft, said second rotating part having an outwardly extending flange adjacent its turbine end, spaced from the outwardly extending flange of said first rotating part and forming a second thrust bearing interface, said thrust bearing interface of said first rotating part engaging said thrust bearing member on its compressor side and said thrust bearing interface of said second rotating part engaging said thrust bearing member on its turbine side.

9. The assembly of claim 8 wherein said second housing part, said separate bearing supporting member and said thrust bearing member include communicating oil passages for lubrication of said first and second bearings and said thrust bearing.

10. The assembly of claim 1 wherein said first bearing is supported by a removable part of the compressor end of the housing, and said thrust bearing comprises a first rotating part with an outwardly extending flange forming at least one thrust bearing interface fastened to and rotating with said rotating shaft and a separate stationary thrust bearing part carried by said housing and providing at least one thrust bearing interface engageable by the thrust bearing interface of said first part.

11. The assembly of claim 10 wherein said separate stationary thrust bearing part includes a separable portion at its compressor side, said separate stationary part and its separable portion forming an annular cavity with thrust bearing interfaces on its compressor end side and turbine end side, and said outwardly extending flange of said first rotating part provides thrust bearing interfaces on its compressor and side and turbine end side engageable with the thrust bearing surfaces forming the compressor end and turbine end sides of the annular cavity of said second part.

12. The assembly of claim 10 wherein said thrust bearing comprises a second rotating part with an outwardly extending flange forming a thrust bearing interface fastened to and rotated by said rotating shaft, said outwardly extending flange of said first rotating part being located on the compressor side of the separate stationary part and said outwardly extending flange of said second rotating part being located on the turbine side of the separate stationary part, said thrust bearing interfaces being formed by the compressor side of the separate stationary part and the adjacent side of the outwardly extending flange of the first rotating part and by the turbine side of the separate stationary part and the adjacent side of the outwardly extending flange of the second rotating part.

13. The assembly of claim 10 wherein said housing and separate stationary part include oil passages for lubrication of said thrust bearing.

14. The assembly of claim 10 wherein the removable part of the bearing housing includes a separate bearing supporting member for the first bearing.

15. The assembly of claim 14 wherein said housing and separate bearing supporting member include oil passages for lubricating the first bearing.

16. The assembly of claim 10 wherein said removable part of the housing carries stator windings for said electric motor and the compressor rotor carries motor magnets for said electric motor.

17. The assembly of claim 16 wherein said removable part of the housing forms a coolant passage in heat transfer relationship with said stator windings.

18. The assembly of claim 10 wherein the exhaust gas volute is removably carried at the turbine end of said housing and the compressor casing is removably carried at the compressor end of said removable part of said housing.

19. The assembly of claim 1 wherein said rotating shaft has a reduced diameter portion at its compressor end carried by said first bearing and a larger diameter portion at its turbine end carried by said second bearing and a thrust bearing engagement surface between said first and second shaft portions.

20. The assembly of claim 19 wherein said thrust bearing comprises first and second thrust bearing sleeves carried by said rotating shaft between said shaft thrust bearing engagement surface and said compressor wheel, said second thrust bearing sleeve being engaged with said shaft thrust bearing engagement surface, said first thrust bearing sleeve being engaged with said second thrust bearing sleeve and providing an outer surface with the larger diameter of the turbine end portion of the shaft, said outer surface of said first thrust bearing sleeve being rotatably carried by said first bearing.

21. The assembly of claim 20 wherein said first and second thrust bearing sleeves include outwardly extending flanges forming thrust bearing interfaces for engagement with adjacent stationary thrust bearing surfaces carried by the housing.

22. The assembly of claim 21 wherein the adjacent stationary surfaces are formed by a separate stationary thrust bearing member located between the outwardly extending flanges of said first and second thrust bearing sleeves.

23. In a motor-assisted turbocharger wherein an assisting electric motor and a compressor rotor are carried at one end of a rotating shaft outboard of a compressor end bearing with an exhaust gas turbine and turbine end bearing at the other end of the rotating shaft, the improvement comprising a thrust bearing assembly for the rotating shaft located between the compressor end bearing and turbine end bearing.

24. The improvement of claim 23 wherein the thrust bearing comprises a pair of outwardly extending flanges engaged with the rotating shaft adjacent their interiors and providing thrust bearing interfaces adjacent their exteriors adapted to engage adjacent stationary walls of a lubricated cavity formed in a stationary support for the compressor and turbine end shaft bearings.

25. The improvement of claim 24 wherein each one of the pair of outwardly extending flanges is formed on a sleeve separately carried by the rotating shaft.

26. A turbocharger assembly for an internal combustion engine, comprising a compressor wheel and turbine wheel mounted at opposite ends of a rotating shaft, a first bearing adjacent the compressor end of the rotating shaft, a second bearing adjacent the turbine end of the rotating shaft, a thrust bearing assembly for said rotating shaft between said first and second bearings, and a housing carrying said first and second bearings and said rotating shaft, said first bearing being supported by a removable part of the compressor end of the housing, and said thrust bearing assembly comprising a first rotating part with an outwardly extending flange forming a first thrust bearing interface fastened to and rotating with said rotating shaft, a second rotating part with an outwardly extending flange forming a second thrust bearing interface fastened to and rotating with said rotating shaft, and a separate stationary thrust bearing part carried by said housing and providing a pair of thrust bearing interfaces engageable by the first and second thrust bearing interfaces of said first and second rotating parts.

27. The assembly of claim 26 wherein said housing and separate stationary part include oil passages for lubrication of said thrust bearing.

28. The assembly of claim 26 wherein the removable part of the bearing housing includes a separate bearing supporting member for the first bearing.

29. The assembly of claim 28 wherein said housing and separate bearing supporting member include oil passages for lubricating the first bearing.

30. A turbocharger assembly for an internal combustion engine, comprising a compressor wheel and turbine wheel mounted at opposite ends of a rotating shaft, a first bearing adjacent the compressor end of the rotating shaft, a second bearing adjacent the turbine end of the rotating shaft, a thrust bearing assembly for said rotating shaft between said first and second bearing, and a housing carrying said first and second bearings and said rotating shaft, said rotating shaft having a reduced diameter portion at its compressor end carried by said first bearing and a larger diameter portion at its turbine end carried by said second bearing and a thrust bearing engagement surface between said first and second shaft portions.

31. The assembly of claim 30 wherein said thrust bearing assembly comprises first and second thrust bearing sleeves carried by said rotating shaft between said shaft thrust bearing engagement surface and said compressor wheel, said second thrust bearing sleeve being engaged with said shaft thrust bearing engagement surface, said first thrust bearing sleeve being engaged with said second thrust bearing sleeve and providing an outer surface with the larger diameter of the turbine end portion of the shaft, said outer surface of said first thrust bearing sleeve being rotatably carried by said first bearing.

32. The assembly of claim 31 wherein said first and second thrust bearing sleeves include outwardly extending flanges forming thrust bearing interfaces for engagement with adjacent stationary thrust bearing surfaces carried by the housing.

33. The assembly of claim 32 wherein the adjacent stationary surfaces are formed by a separate stationary thrust bearing member located between the outwardly extending flanges of said first and second thrust bearing sleeves.

34. A turbocharger assembly for an internal combustion engine, comprising a compressor wheel and a turbine wheel mounted at the opposite ends of a rotatable shaft, a first bearing adjacent the compressor end of the rotating shaft, a second bearing adjacent the turbine end of this rotating shaft, a housing carrying said first and second bearings and said rotating shaft, said first bearing being supported by a removable part of the compressor end of the housing, and a thrust bearing comprising a first rotating part with an outwardly extending flange forming a pair of thrust bearing interfaces, and a separate stationary part comprising a separable portion on its compressor side and forming an annular cavity, said stationary part providing inner faces of the annular cavity on each side of the outwardly extending flange, said inner faces forming thrust bearing interfaces for engagement by said pair of thrust bearing interfaces of said outwardly extending flange.

* * * * *